A. M. SHEARER.
SINGLE LINE GRAB BUCKET CONSTRUCTION.
APPLICATION FILED JULY 23, 1920.

1,422,003.

Patented July 4, 1922.
4 SHEETS—SHEET 1.

A. M. Shearer INVENTOR

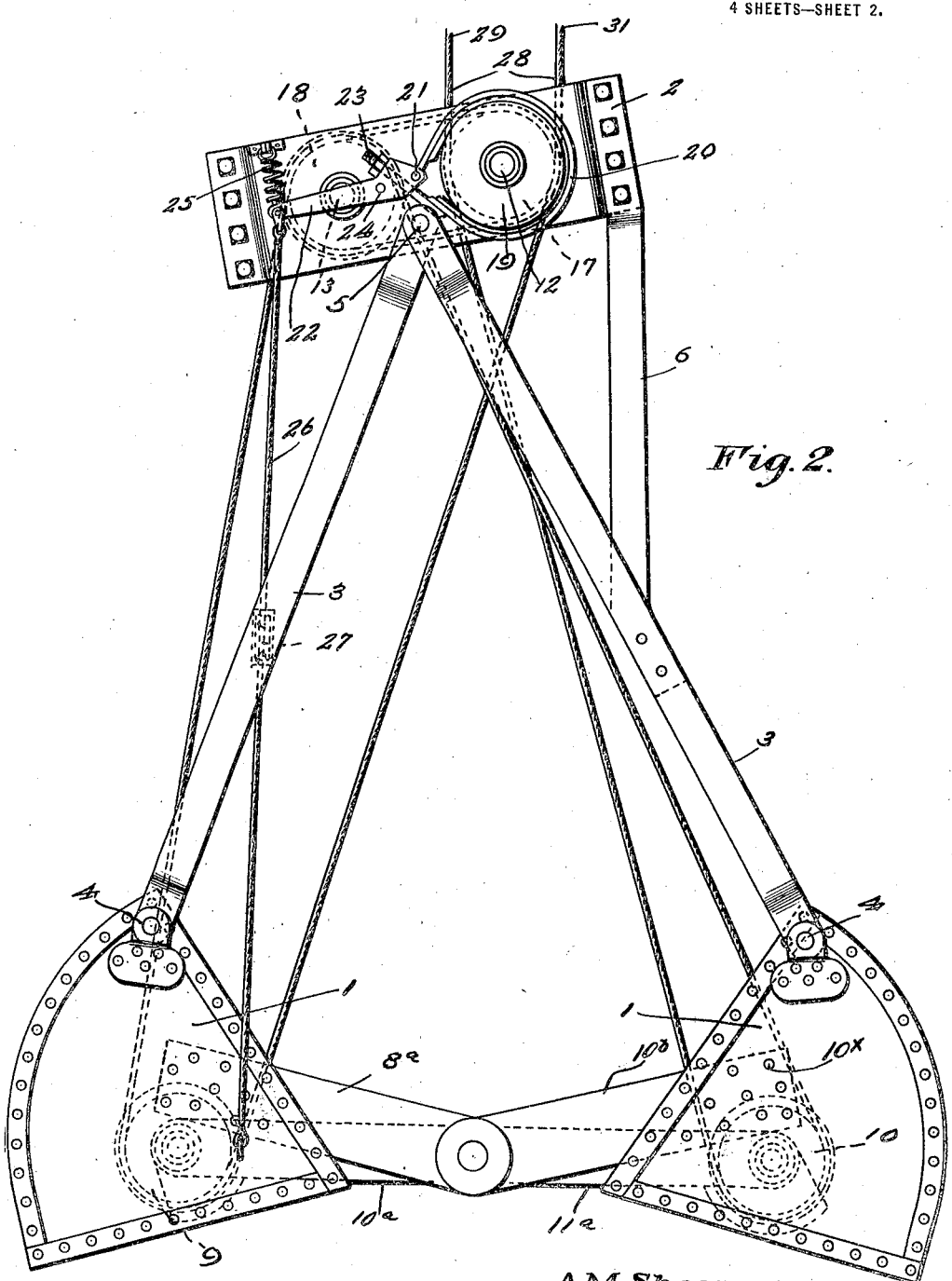

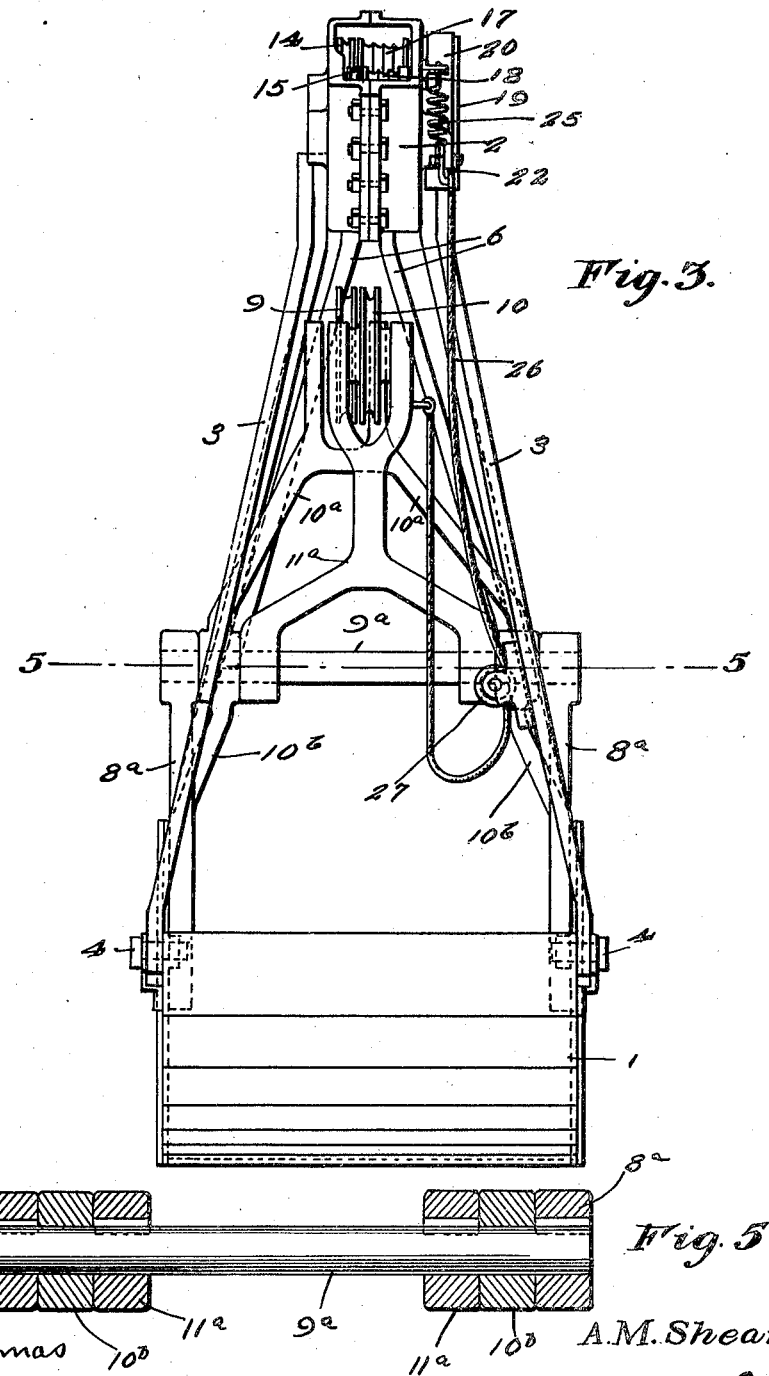

A. M. SHEARER.
SINGLE LINE GRAB BUCKET CONSTRUCTION.
APPLICATION FILED JULY 23, 1920.
1,422,003.
Patented July 4, 1922.
4 SHEETS—SHEET 4.
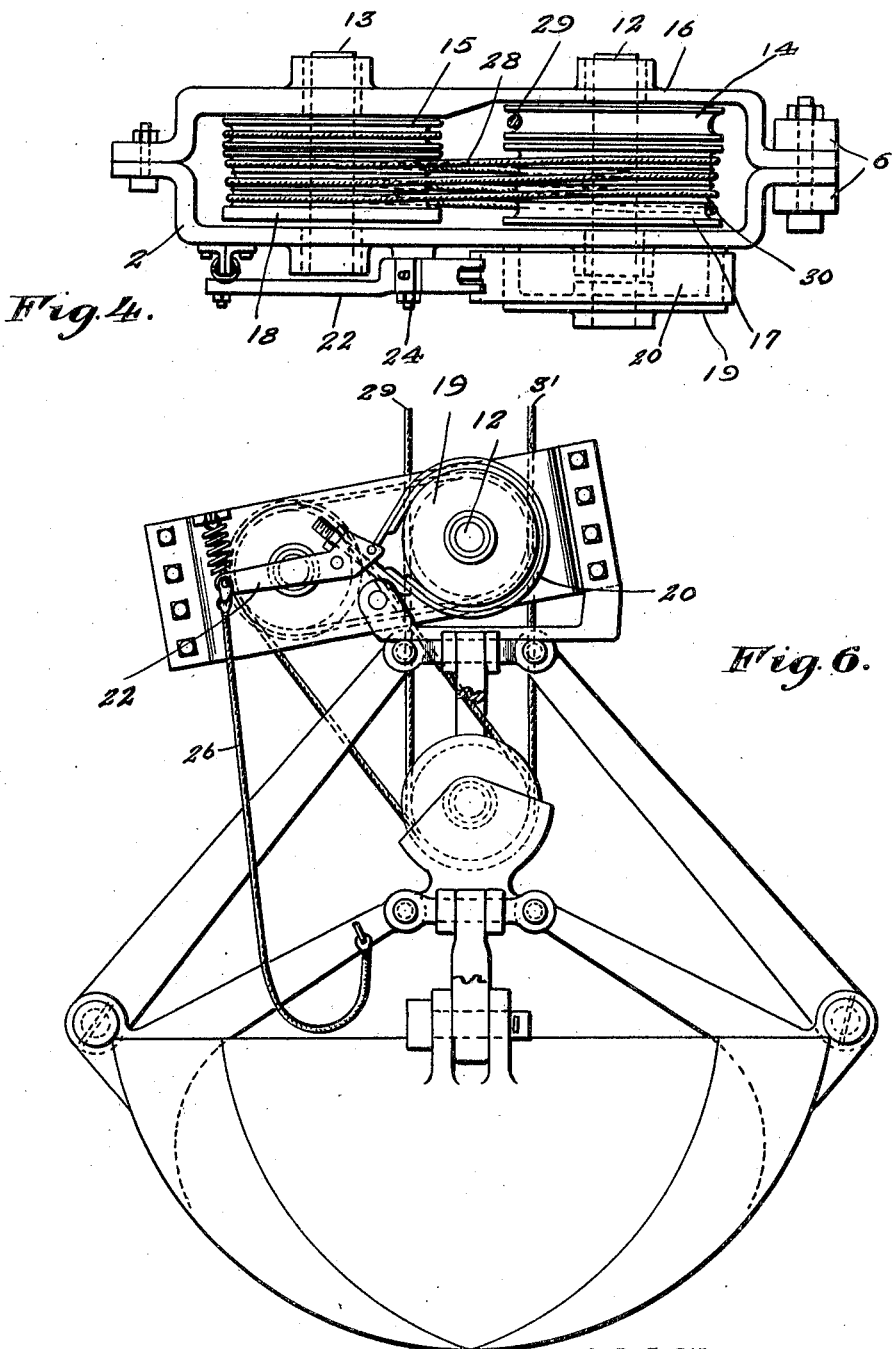

UNITED STATES PATENT OFFICE.

ARTHUR M. SHEARER, OF INDIANA, PENNSYLVANIA.

SINGLE-LINE GRAB-BUCKET CONSTRUCTION.

1,422,003.  Specification of Letters Patent.  Patented July 4, 1922.

Application filed July 23, 1920. Serial No. 398,368.

*To all whom it may concern:*

Be it known that I, ARTHUR M. SHEARER, a citizen of the United States, residing at Indiana, in the county of Indiana and State of Pennsylvania, have invented new and useful Improvements in Single-Line Grab-Bucket Constructions, of which the following is a specification.

My present invention has for its object the provision of a simple single-line bucket construction, possessed of the capacity of being picked up and closed at any time and to stay closed until the line is slackened, and one that is well adapted to withstand the rough usage to which grab buckets and analogous devices are ordinarily subjected.

To the attainment of the foregoing the invention consists in the improvement as hereinafter described and definitely claimed.

In the accompanying drawings, hereby made a part hereof:—

Figure 2 is a side elevation showing said embodiment as open.

Figure 3 is an end elevation of said embodiment.

Figure 4 is a plan view of the same.

Figure 5 is an enlarged detail section taken in the plane indicated by the line 5—5 of Figure 3.

Figure 6 is a side elevation showing as closed a modification hereinafter explicitly referred to.

Similar numerals designate corresponding parts in Figures 1 to 5 to which reference will first be made.

Figure 1:
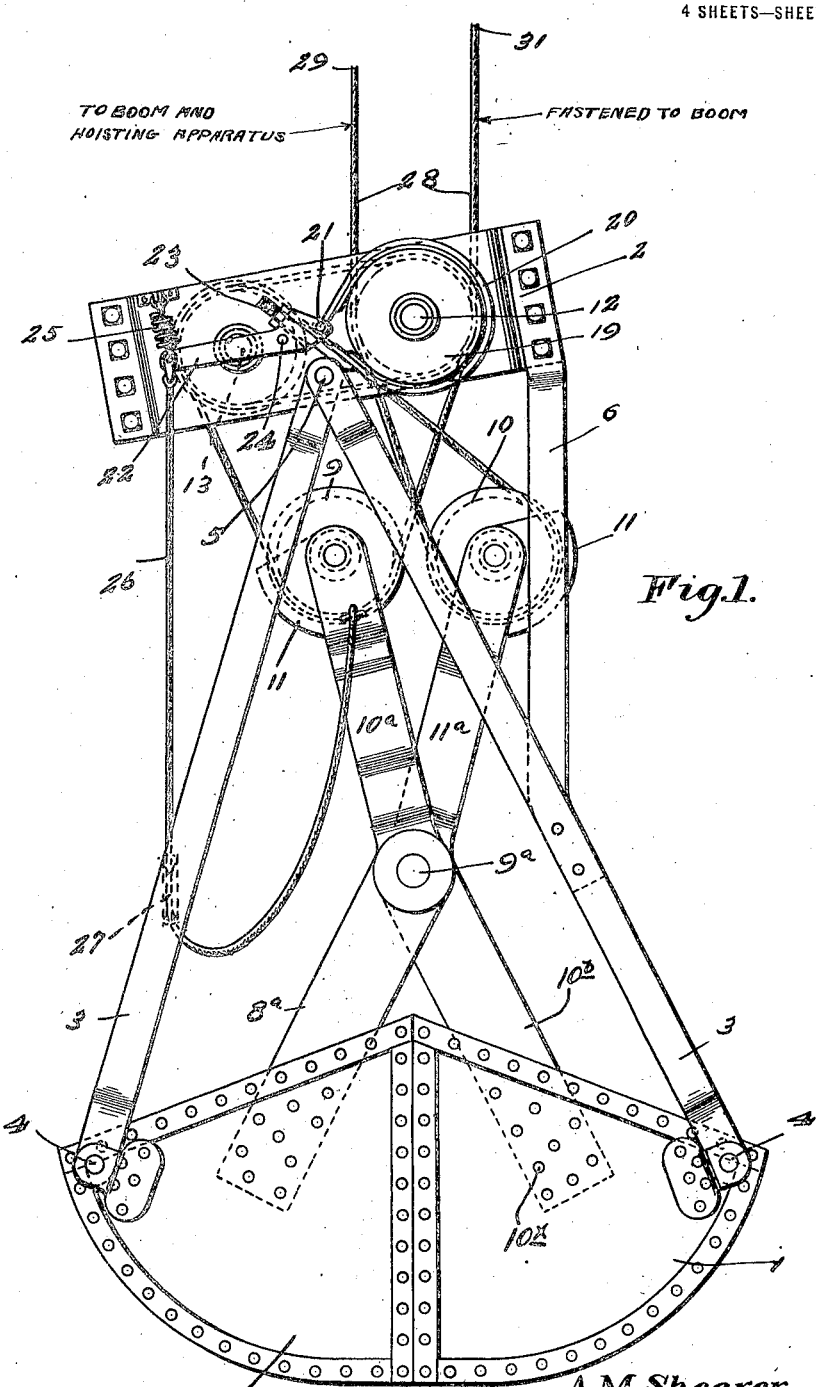
Figure 1 is a side elevation showing one embodiment of my invention as closed.

In addition to the separable bucket sections 1 my improvement comprises a head 2, positioned above and spaced from the sections 1, and suspending arms 3, pivoted to the bucket sections 1 at the points 4, and to the head 2 at the points 5. At 6 is a pair of braces through the medium of which one end pair of suspending side arms 3 is fixedly connected with the head 2. Fixedly connected to the bucket sections 1 are arms 8ª and 10ᵇ, associated with which are a transverse shaft 9ª and arms 10ª and 11ª by which are carried sheaves 9 and 10, respectively, guard housings 11 being preferably provided for said sheaves, as shown. The arms 10ᵇ are integral with the arms 10ª as clearly shown in Figure 3. Journaled in the head 2 are transverse shafts 12 and 13, and loose on said shafts are circumferentially grooved pulleys 14 and 15, respectively. The said pulleys 14 and 15 are arranged between the side walls 16 of the head 2, and also arranged between said side walls 16 are drums 17 and 18 which are fixed on the shafts 12 and 13, respectively, and are preferably, though not necessarily, circumferentially grooved as illustrated. Arranged exteriorly of the head 2 and fixed on the shaft 12 is a brake disk 19, and passed around the said brake disk is a brake band 20, one end of which is pivotally connected at 21 to one arm of a lever 22, and the other end of which is adjustably connected at 23 to said arm of the lever. The lever 22 is fulcrumed at 24 on the head 2, and is subject to the action of a light retractile spring 25. The said spring 25 is connected to the outer arm of the lever 22, and also connected to said arm 22 is a cable 26 that is passed around a guide pulley 27 on one of the side arms 3 and is connected at its opposite end to the adjacent arm of 10ª, Figures 1 and 2. When the bucket is opened the connection described including the cable 26 serves to release the brake so as to permit of dumping and lowering of the bucket in an open state. In this connection the retractile spring 25 in combination with the lever 22 and the head 2 affords slight tension which will provide a desirable braking effect in conjunction with the shaft 12 and the brake disk 19. It is within the purview of my invention to employ connecting gearing between the shafts 12 and 13 of the drums 17 and 18 as when it is desired to increase the frictional hold on the line 28. I prefer, however, to omit the said connection or any other connection between the shafts 12 and 13 for the sake of simplicity and also because the bucket construction is highly efficient without the employment of such a connection. The line 28 is designed to be passed from the point indicated by 29 over a sheave on a boom (not shown) and then to any appropriate hoisting apparatus also not shown. From the point 29 the line or cable 28 is carried downwardly and about the pulley 14, and then to and around the pulley 10. From said pulley 10 the line is carried upwardly and over the pulley 15 and then downwardly and around the pulley 9, and then upwardly when it is carried a number of times around the drums 17 and 18, and is taken off the drum 17 at the point 30, Figure 4, and is then carried upwardly as indicated by 31 in Figure 1, and is designed to be fastened to the before mentioned boom.

It will be apparent from the foregoing that only by hoisting the cable portion 29; also; that the bucket will be securely retained in closed state so long as the portion 29 of the cable 28 is held against downward movement. When, however, said line or cable portion 29 is released and permitted to move downwardly, the bucket will be opened, and will be held open during the lowering of the bucket. When, however, the said portion 29 of the cable or line 28 is drawn upwardly the closing of the bucket will be effected, and the bucket will be held in the closed state until said line portion 29 is again released.

By comparison of Figures 1, 3 and 5 it will be understood that in the preferred embodiment of my invention the arms 8ª, 10ª, and 11ª and the shaft 9ª are constructed and relatively arranged in a peculiar manner— i. e., the outer arms 8ª are fixed to the bucket sections 1 and are keyed to the transverse shaft 9ª, and the arms 10ᵇ are loose on the shaft 9ª while the arms 11ª are keyed to the shaft 9ª. The upper arms 10ª are merged into lower arms 10ᵇ, Figure 3. This construction is manifestly strong and durable, and by reason of the same it will be noted that release of the line or cable portion 29 will be attended by outward swinging movement of the arms 8ª and the separation of the bucket sections 1. The arms 10ᵇ are fixedly connected at their outer ends to one bucket section 1, as designated by 10ˣ in Figures 1 and 2, and are integral with the arms 10ª as before stated. In other words the arms 10ᵇ and 10ª are comprised in the lever that is loosely mounted on the shaft 9ª.

In the modification shown in Figure 6 I have illustrated my improvement in conjunction with an "orange peel" bucket, and inasmuch as the operation is generally the same as that before described it is unnecessary to further describe the modification except to say that the sheaves of the modification corresponding to the sheaves 9 and 10 of the embodiment illustrated in Figures 1 to 5 are arranged side by side.

Having described my invention, what I claim and desire to secure by Letters-Patent, is:—

1. In a single-line grab bucket construction, the combination of a head, swinging bucket sections connected with and suspended therefrom, sheaves connected with the bucket sections, drums and pulleys carried by the head, brake means also carried by the head and connected with one of the bucket sections and a single looped line or cable suspending the head and bucket sections and engaging the sheaves, drums and pulleys, said head suspended by said looped line.

2. In a single-line grab bucket construction, the combination of a head, swinging bucket sections suspended therefrom, sheaves connected with the bucket sections, drums and pulleys carried by the head, brake means also carried by the head and connected with one of the bucket sections and a single looped line or cable suspending the head and bucket sections and engaging the sheaves, drums and pulleys, the said brake means including a tension spring.

3. In a single-line grab bucket construction, the combination of a head, swinging bucket sections suspended therefrom, sheaves connected with the bucket sections, drums and pulleys carried by the head, brake means also carried by the head and connected with one of the bucket sections and a single looped line or cable suspending the head and bucket sections and engaging the sheaves, drums and pulleys, the said brake means including a disk fixed to one of the drums, a band, and a lever connected to the band.

4. In a single-line grab bucket construction, the combination of a head, swinging bucket sections suspended therefrom, sheaves connected with the bucket sections, drums and pulleys carried by the head, brake means also carried by the head and connected with one of the bucket sections and a single looped line or cable suspending the head and bucket sections and engaging the sheaves, drums and pulleys, the said brake means including a disk fixed to one of the drums, a band, a lever connected to the band, and a tension spring, and the connection between the brake means and bucket section including a cable connected to said lever.

5. In a single-line grab bucket construction, the combination of a head, swinging bucket sections suspended therefrom, sheaves connected with the bucket sections, drums and pulleys carried by the head, brake means also carried by the head and connected with one of the bucket sections and a single looped line or cable suspending the head and bucket sections and engaging the sheaves, drums and pulleys, the connection between the sheaves and the bucket sections including a lever complementary to one sheave and one bucket section.

6. In a single-line grab bucket construction, the combination of a head, swinging bucket sections, side arms suspending said sections from said head, sheaves connected with the bucket sections, the connection to one sheave and section being in the form of a lever fulcrumed at an intermediate point of its length, drums and pulleys carried by the head, brake means also carried by the head and connected with one of the bucket sections, and a single line or cable suspending the head and bucket sections and engaging the sheaves, drums and pulleys.

7. In a single-line grab bucket construction, the combination of a head, bucket sections connected with and suspended therefrom, sheaves connected with the bucket sections, friction-creating means carried by the head, and a looped line engaging the sheaves and the friction-creating means and suspending the head.

8. In a single-line grab bucket construction, the combination of a head, bucket sections connected with and suspended therefrom, sheaves connected with the bucket sections, friction-creating means carried by the head, and a looped line engaging the sheaves and the friction-creating means and suspending the head; the friction-creating means being tensioned and connected with one of the bucket sections.

In testimony whereof I affix my signature.

ARTHUR M. SHEARER.